March 6, 1973  J. D. BODE  3,719,456
REACTION CHAMBER HEATED DEVICE FOR OXYGEN GENERATION
Filed March 19, 1971  2 Sheets-Sheet 2
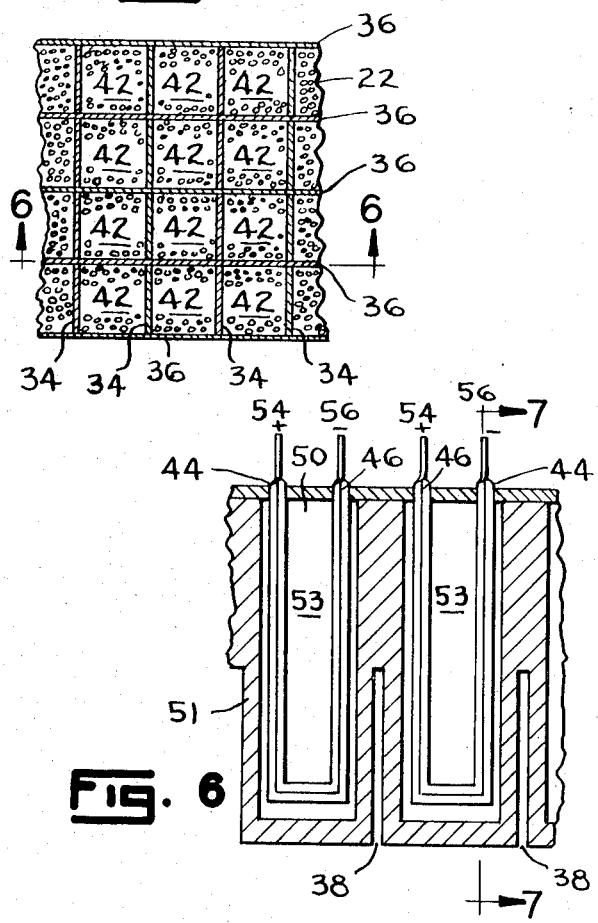
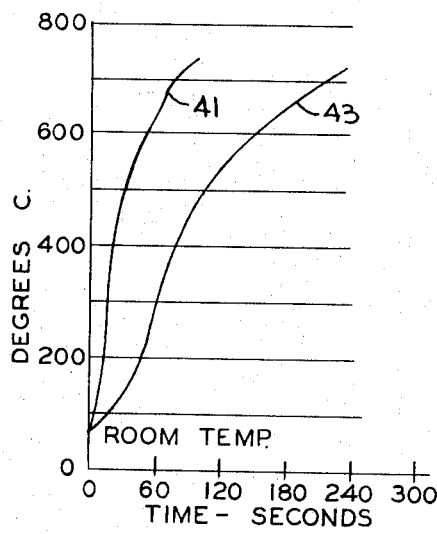
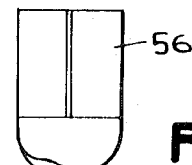
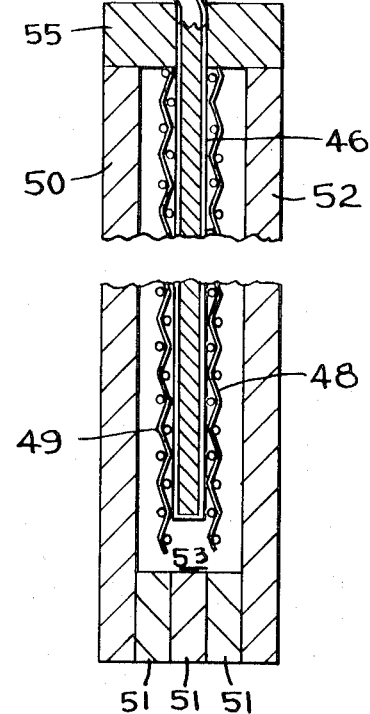
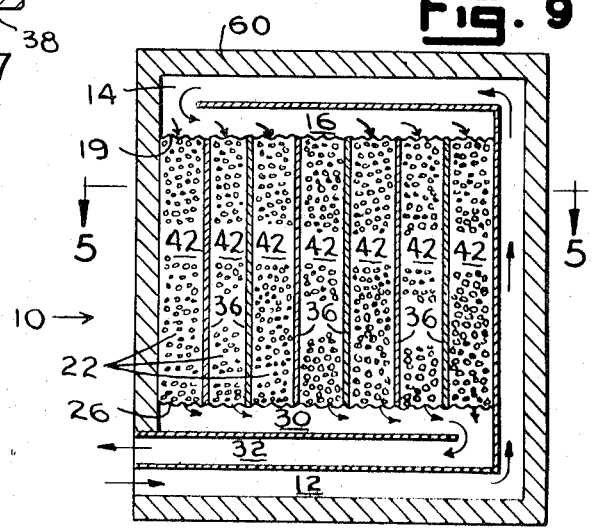
*INVENTOR*
JAMES D. BODE
BY
Leo H. McCormick Jr
ATTORNEY United States Patent Office 3,719,456
Patented Mar. 6, 1973

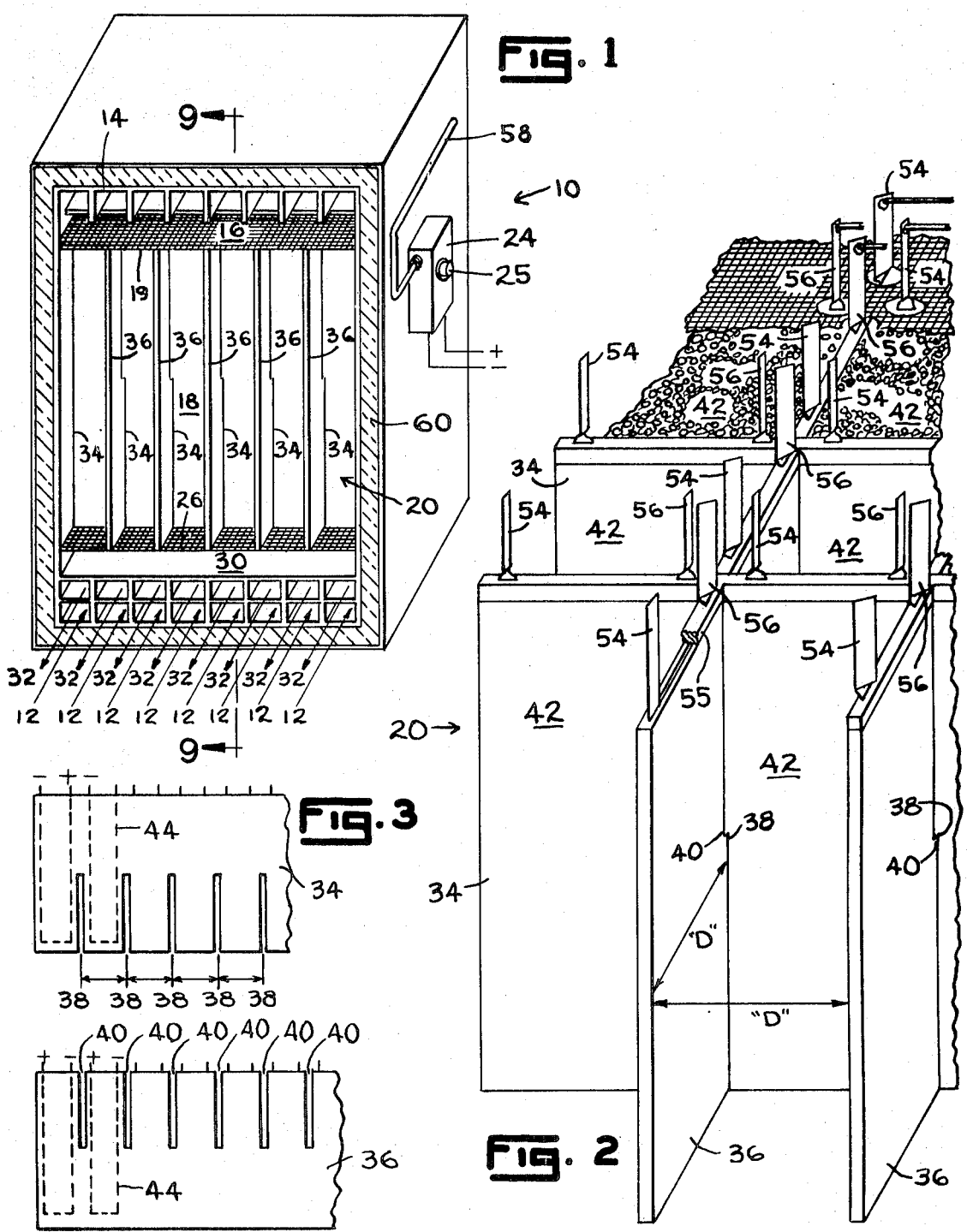

3,719,456
REACTION CHAMBER HEATED DEVICE FOR OXYGEN GENERATION
James D. Bode, Southfield, Mich., assignor to The Bendix Corporation
Filed Mar. 19, 1971, Ser. No. 125,977
Int. Cl. B01j 7/00; C01b 13/02
U.S. Cl. 23—281                    10 Claims

ABSTRACT OF THE DISCLOSURE

An apparatus for heating barium oxide to a reaction temperature with air to form barium peroxide. The apparatus has a housing with an air inlet passage which partially surrounds and is connected to an internal chamber. Centrally located in the internal chamber are hollow plate members interlocked by a series of frictional abutting slots to form rectangular columns. Inside of the hollow plate members between the slots a plurality of elements are connected to a source of electricity. A blanket of electrically insulating material surrounds each element to prevent electrical energy from being transmitted to the plate members. A control switch regulates the flow of electrical energy to each element which converts the electrical energy to thermal energy. This thermal energy is transferred through the columns to barium oxide crystals retained in the columns by mesh. As the temperature of the barium oxide crystals increases, air flow through the inlet passage and the columns forms barium peroxide while the unreacted gas and nitrogen flow through an outlet passage into the environment.

BACKGROUND OF THE INVENTION

For a time, oxygen was commercially produced by heating beds of barium oxide crystals retained in a chamber to a temperature of between 700–750° C. and then subjecting the bed to clean, dry air under pressure, causing the barium oxide to react with oxygen from the air to form barium peroxide. After a period of time, the pressurized air was stopped and a vacuum drawn across the bed. As the air in the chamber was evacuated, the barium peroxide would release the earlier acquired oxygen and revert back to barium oxide. Then the released molecules of oxygen were pumped into a storage vessel for later use.

From experimentation, it was determined that the efficiency of the beds of barium oxide could be increased if the temperature of the barium oxide crystals was kept constant. But since the crystals of barium oxide were alternately subjected to air under pressure from the outside and then vacuum, the chamber temperature would fluctuate. The crystals of barium oxide located nearer the heater unit received the greatest heat while the crystals away from the heater were relatively cooler. If the material is overheated it sinters or melts and there is a loss of activity because the surface area of the material decreases. This is not too series a problem during the oxidation part of the process since the pressure of the air flowing through the chamber can be increased to maintain uniform flow through the bed. However, channels or cracks will form in the bed during evacuation for the oxygen release part of the cycle non-uniformity in packing and excessive void spaces.

If channeling occurs in the evacuation part of the cycle, a pressure drop will be set up in the more dense portion of the bed and prevent all the barium peroxide crystals from reaching the low pressure. The barium peroxide crystals not subjected to a sufficiently low pressure do not revert to barium oxide and, therefore, do not contribute to the extraction of oxygen from the bed.

In copending U.S. application 65,554, now U.S. Pat. 687,634, issued Aug. 29, 1972, owned by the common assignee of this application and incorporated herein by reference, a series of alternate disc and washer type heater units, having a single layer of barium oxide crystals located on both sides, are supported on a common support. Each heater unit is individually controlled to supply a uniform temperature to the barium crystals. Thus, the efficiency of the oxygen generation device is maintained within an controlled chamber without danger of sintering or melting the barium oxide-barium oxide mixture. However, the barium oxide is in direct contact with the heating elements and must overcome the cooling effect caused by alternately subjecting the barium oxide—barium peroxide to air under pressure and then to vacuum.

SUMMARY OF THE INVENTION

Through my invention, I have devised an apparatus with means for heating barium oxide crystals for use in an oxygen extraction system. In the apparatus a first series of hollow rectangular plate members, each having regularly spaced slots extending to its midpoint, are interlocked with a second series of identical rectangular plate members perpendicular to the first to form rectangular columns. A U-shaped strip of high temperature alloy steel provides a continuous uniform electrical resistance path. An electrical insulating member is placed around the U-shaped strip of steel and this package is sandwiched between the walls and each of the slots inside of the hollow plate members. An electrical energy control is connected to the U-shaped strips and barium oxide crystals are placed in the rectangular columns. A mesh member is placed on both ends of the column and this is then placed in a chamber. An inlet passage partially surrounds the chamber and supplies clean fresh air to the chamber while an outlet passage adjacent to a segment of the inlet passage is connected to a regulator.

In response to an operator signal, the regulator permits clean fresh air to flow through the inlet passage and into the chamber. This same operational signal activates the electrical energy control and transmits electricity to each U-shaped strip which offers resistance to the electrical flow. This resistance manifests itself as thermal energy to heat both walls of the plate member between the slots to provide controlled thermal energy to each side of the column. Since each U-shaped strip is identical, the heating of the barium oxide crystals will be uniform. After maintaining the crystals at between 700–750° C. for a predetermined period of time, the regulator terminates the flow of air through the inlet passage and through a vacuum evacuates the chamber causing the oxygen molecules which entered the barium oxide crystals to be released. The released molecules of oxygen are directed to a storage vessel for later use.

During each following recycle, the U-shaped strip heating element located inside the hollow plates will permit a more rapid bulid-up of barium oxide to barium peroxide to barium peroxide since the electrical control can operate to maintain the temperature at between 700–750° C. during the evacuation cycle without being adversely affected by the exiting flow of air. In addition, the build-up time is further reduced since a controlled heating element surrounds the barium oxide crystals causing thermal energy to be transmitted to all four sides of each crystal. Further, by locating the inlet passages adjacent the outlet passages and around the chamber, the supplied air has been prewarmed and will not produce as great a temperature fluctuation within the chamber thereby allowing the oxygen generation sysetm to operate within the maximum range of total efficiency, with less heat needed to be supplied by the elements, in the barium oxide-barium peroxide reaction.

It is therefore the object of this invention to provide the means through which a chamber containing barium oxide is uniformly heated.

It is another object of the invention to provide a means to uniformly control heating elements surrounding a column of reaction material.

These and other objects become readily apparent from reading the specification and viewing the drawings.

BRIEF DESCRIPTION OF THE DRAWINGS

FIG. 1 is a perspective view of the heating apparatus of this invention for use in a system for extracting oxygen from barium oxide-barium peroxide;

FIG. 2 is a perspective view of the composite heating unit of the heating apparatus of FIG. 1;

FIG. 3 is a sectional view of a single plate of the composite heating unit with regularly spaced slots opposite an electrical connection for an internal resistant element;

FIG. 4 is a sectional view of a single plate of a composite unit with regularly spaced slots adjacent an electrical connection for an internal resistive element;

FIG. 5 is a sectional view taken substantially along line 5—5 of FIG. 9 with the housing omitted showing the barium oxide-barium peroxide crystals retained within a rectangular enclosure;

FIG. 6 is a sectional view taken along line 6—6 of FIG. 5 showing a plurality of internal resistive elements located between the slots of the column;

FIG. 7 is a sectional view taken along line 7—7 of FIG. 6 showing a side view of the composite heating unit;

FIG. 8 is a graph showing the time required to reach reaction temperature for different size columns; and FIG. 9 is a sectional side view of the heating apparatus of FIG. 1.

DETAILED DESCRIPTION OF THE PREFERRED EMBODIMENT

In the heating apparatus 10 shown in FIGS. 1 and 9, clean, pure air from a source, such as that described in copending U.S. application 86,240 and incorporated herein by reference, is carried through a series of inlet passages 12 around the inside face of the housing 14 along a path as shown by the arrows in FIG. 9.

Each of the inlet passages terminates in an air distribution chamber 16 separated from an internal reaction chamber 18 by a first mesh member 19. Centrally located in the internal reaction chamber 18 is a heating means 20 containing beds of crystals of barium oxide 22, as shown in FIG. 5.

The barium oxide crystals being retained in each bed 22 by a second mesh member 26. In response to an operation signal being transmitted to a control means 24 electrical energy is transmitted to the heating means 20 and converted to thermal energy. This thermal energy will cause the temperature of the barium oxide crystals to rise to between 700–750° C. where a reaction with the clean pure air will occur to form barium peroxide. The remaining unreacted air and reacted air, which now will principally be nitrogen, will pass into an exiting chamber 30 before entering a series of outlet passages 32. The series of outlet passages 32 are located adjacent the inlet passages 12 in order that the exiting air after passing through the heated internal reaction chamber 18 will impart a transfer of thermal energy to initially heat the incoming air. A regulator (not shown) connected to the outlet passage 32 is responsive to the operation signal and will periodically interrupt the flow of air through the inlet passages 12 while reducing the pressure in the reaction chamber 18 with a vacuum. As the pressure in the reaction chamber drops, each crystal of the barium peroxide will revert to barium oxide by releasing molecules of oxygen. The regulator directs these released molecules of oxygen to a retention vessel (not shown) where they are stored under pressure for later use.

In more particular detail the heating means 20 shown in FIG. 2 consists of a plurality of rectangular hollow plate members 34 and 36 as shown in FIGS. 3 and 4, respectively. Each of the hollow plate members 34 shown in FIG. 3, and plate 36 shown in FIG. 4 is comprised of a pair of thin sheets 50 and 52, as shown in FIG. 7, cut into a rectangular shape with a series of regularly spaced slots 38 and 40, extending to the midpoint, punched along their bottom and top, respectively. A series of spacer members 51 located between and secured to the thin sheets 50 and 52 form a series of individual heating chambers 53 between the slots 38 and 40. The heating means 20 is assembled by placing a plurality of hollow plate members 36 perpendicular to a plurality of hollow plate members 34 with slots 38 and 40 aligned so as to frictionally engage the solid portion of the opposite plate when joined together to form a plurality of rectangular columns 42 as shown in FIG. 2.

The distance "D" between the slots 38 and between the slots 40 preferably should be between ½" and 1" since barium oxide crystals are poor thermal energy conductors. As shown in FIG. 8, if the distance chosen is approximately ½", the time required to heat the barium oxide crystals from room temperature to the ideal reaction temperature of between 700–750° C. is approximately 1 minute as shown in line 41 while if 1" is chosen between slots, the time approaches 4 minutes as shown by line 43. As shown by FIG. 8, as the size of the column becomes larger, the reaction time and control over fluctuation of temperature increased to a period where the efficiency of the operation is hampered in the larger columns since there will be too much delay between alternating cycles in attempting to maintain the operating temperature constant.

Located inside of the rectangular hollow plated members 34 and 36 between each slot is a U-shaped heating element 44 as shown in FIGS. 6 and 7. Each heating element 44 is constructed of thin sheet of high temperature alloy steel photoetched to form an electrical energy path between electrical connections 54 and 56. The heating elements 44 can be connected in any desired series or parallel arrangement to match a given AC or DC electrical power source and to provide uniform heating throughout the reaction chamber 18. All surfaces of the heating element 44 will be covered with a coating 46 of alumina, as shown in FIG. 7, to confine the flow of electrical energy along the heating element. Since the plate members 34 and 36 are constructed of high temperature alloy steel, layers of alumina cloth 48 and 49 will additionally be placed on each side of the heating element 44 or the heating elements 44 can be completely imbedded in an alumina powder to electrically insulate the elements from the walls 50 and 52 of the plate members which are diffusion bonded together to form a composite unit. The electrical connectors 54 and 56 are carried through insulated cap 55 and connected to electrical leads. Then, the leads from each of the connections 54 and 56 are joined together in a plurality of bundles 58 and carried through a hermetical seal in the housing 14 to the control means 24 where monitor means contained therein controls the heating elements 44.

MODE OF OPERATION OF THE PREFERRED EMBODIMENT

In response to an operator, a signal is transmitted to a regulator (not shown) and the electrical control means 24. The signal to the regulator will actuate a flow of clean pure air through the inlet passages 12 into the distribution chamber 16 through the rectangular columns 42 filled with barium oxide into the exiting chamber 30 and out through the outlet passages 32 into the regulator as shown in FIG. 9. Simultaneously the electrical control means 24 has been supplying electrical flow to the U-shaped elements 44 to be converted into thermal energy and heat the crystals of barium oxide retained in columns 42 shown in FIG. 5 in a manner as shown by curve 41 in FIG. 8. After a predetermined period of time, usually about 2 minutes, the regulator will terminate the flow of air through the inlet passages 12 and cause a vacuum to reduce the pressure in chamber 18. As the pressure in chamber 18 is reduced, molecules of oxygen will be released as the barium peroxide is converted back to barium oxide. The released molecules of oxygen are collected and stored for later use. When the pressure in chamber 18 approaches an absolute vacuum usually within 2–4 minutes, essentially all the crystals of barium peroxide in columns 42 will have been involved in this oxygen generation process, and the regulator again permits pure clean air to flow through the inlet passages 12. While the vacuum is being applied to the chamber 18, the heating element 44 will continue to maintain the temperature within the columns at the predetermined reaction temperature.

Throughout the cycling from air flow to vacuum, monitor means 25, of a known type, within the electrical control means 24 will stabilize the heating elements 44 within the walls 34 and 36 in order to maintain the temperature in each column 42 at the reaction temperature. If the monitor means senses that one wall of a column 42 is approaching a temperature which would melt the contacting barium oxide, the electrical energy supplied that heating element 44 is reduced or terminated until the air passing through the column cools that portion of the column. Further, a layer of insulation 60 is placed around the heating apparatus to help eliminate the effect of any outside thermal energy on the reaction chamber 18 and vice versa. Thus, by this heating apparatus, the crystals of barium oxide or any other suitable oxide generate oxygen through the alternating cycling of air and vacuum at a controlled temperature in a rapid sequence.

I claim:
1. An apparatus for raising the temperature of oxide crystals sufficiently to react with air under pressure to form a higher oxide and release oxygen upon being subjected to a vacuum, said apparatus comprising:
   a housing having an internal chamber connected with a series of inlet passages located circumferentially along the internal face of the housing to a source of air and with a corresponding series of outlet passages adjacent a segment of said inlet passages connected to a regulator which controls the flow of said air;
   a first series of rectangular hollow plate members centrally located in said internal chamber, each of said plate members having regularly spaced slots along one side extending to the midpoint of the rectangle;
   a second series of rectangular hollow plate members perpendicularly located with respect to said first series, each of said plate members having a corresponding series of slots which mate with the solid portion of the plate members above the slots in said first series to form interlocking rectangular columns for holding oxide crystals;
   a first mesh member located on the top of said rectangular columns;
   a second mesh member located on the bottom of said rectangular columns, said first and second mesh members retaining the oxide crystals in said columns;
   a U-shaped element located between each slot in said first and second plate members;
   a source of electrical energy connected to each U-shaped element;
   a layer of electrical insulating material located between each of said U-shaped elements and said plate members to assure that the flow of electrical energy is restricted to said U-shaped elements; and
   control means responsive to an operator for permitting electrical energy to flow to each of said U-shaped elements, each of said U-shaped elements resisting said flow and converting the electrical energy to thermal energy causing the oxide crystals contacting the plate members forming said rectangular columns to be heated through conduction, said U-shaped elements uniformly raising the temperature of substantially every oxide crystal held in the rectangular columns to a predetermined reaction temperature.

2. The apparatus, as recited in claim 1 wherein said control means includes:
   monitor means connected to each U-shaped element for regulating the current flow thereto to maintain a uniform predetermined temperature range in the internal chamber.

3. The apparatus, as recited in claim 2 further including:
   insulating means surrounding said housing for reducing the transfer of thermal energy between the internal chamber and an environment to minimize the thermal effects therebetween.

4. The apparatus, as recited in claim 1 further including:
   insulating means surrounding said housing for reducing the transfer of thermal energy between the internal chamber and an environment to minimize the thermal effects therebetween.

5. The apparatus as recited in claim 1 wherein the walls of said first and second plate members are of a high temperature alloy steel which freely transmit and retain thermal energy therein.

6. The apparatus as recited in claim 5 wherein each U-shaped element is formed of a high temperature alloy steel which is photo-etched to produce a substantially uniform path for electrical energy to be communicated throughout the entire element.

7. The apparatus as recited in claim 6 wherein said control means includes:
   monitor means connected to each U-shaped element for regulating the current flow thereto to maintain a uniform predetermined temperature range in the internal chamber.

8. The apparatus as recited in claim 7 wherein the U-shaped elements surrounded by the layer of electrical insulating material are sandwiched between the walls of the first and second plate members which are diffusion bonded together to form a composite unit.

9. The apparatus as recited in claim 8 wherein the size of the openings in the first and second mesh members is small enough to retain oxide crystals of barium oxide yet large enough to permit unrestricted air flow through each column.

10. The apparatus as recited in claim 9 further including:
    insulating means surrounding said housing for reducing the transfer of thermal energy between the internal chamber and an environment to minimize the thermal effects therebetween.

References Cited
UNITED STATES PATENTS

| | | | |
|---|---|---|---|
| 432,815 | 7/1890 | Brin | 23—221 |
| 2,642,340 | 6/1953 | Martin | 23—281 X |

OTHER REFERENCES

A. P. C. Application of Picconi, Ser. No. 365,412, published Apr. 27, 1943.

JOSEPH SCOVRONEK, Primary Examiner

U.S. Cl. X.R.

23—252 R; 219—365, 374; 423—218, 579